United States Patent

Menz et al.

[15] 3,658,555

[45] Apr. 25, 1972

[54] SPREADABLE FATS

[72] Inventors: Hans-Udo Menz, Hamburg-Schenefeld; Johannes Erich Rost, Hamburg; Theophil Wieske, Hamburg, all of Germany

[73] Assignee: Lever Brothers Company, New York, N.Y.

[22] Filed: Mar. 7, 1969

[21] Appl. No.: 805,352

[30] Foreign Application Priority Data

March 7, 1968 Germany............P 16 92 541.0

[52] U.S. Cl..........................99/122 R, 99/122 M, 99/118 R, 99/123, 424/365, 106/243, 252/364
[51] Int. Cl. ............................................A23d 3/00
[58] Field of Search...............99/122 MO, 122, 123, 118, 15; 424/312, 365; 106/243; 260/410.7; 252/364

[56] References Cited

UNITED STATES PATENTS

| | | | |
|---|---|---|---|
| 2,238,442 | 4/1941 | Drew | 260/410.7 |
| 2,874,056 | 2/1959 | Drew | 99/122 X |
| 2,914,546 | 11/1959 | Barsky et al. | 99/122 X |
| 3,006,771 | 10/1961 | Babayan | 99/122 |

*Primary Examiner*—Joseph M. Golian
*Attorney*—Louis F. Kline, Jr., Melvin H. Kurtz and Edgar E. Ruff

[57] ABSTRACT

A novel mixture of $C_8$ and $C_{10}$ glycerides in a specified crystalline form may be used in margarine and other fat compositions. The compositions may be used as the sole or principal fat in food spreads suitable for consumers whose ordinary fat metabolism may be impaired, as an additive to confer a marked cooling effect to conventional edible fat blends, and as a component in other fat compositions which is more resistant to the deterioration commonly met in unsaturated fats.

11 Claims, No Drawings

SPREADABLE FATS

This invention relates to fat compositions. In particular the invention relates to fat compositions which are plastic and which contain or which may consist for their fat components substantially entirely of medium chain triglycerides. These may be defined as triglycerides of $C_8$ and $C_{10}$ saturated fatty acids, in contrast to the acids predominating in fats, which are not only of greater chain length but are often also unsaturated.

The present invention provides a fat composition comprising a mixture of $C_8$ and $C_{10}$ glycerides, including at least about 45 percent tricaprin, of which a substantial, i.e., at least 20 percent of the mixture, part is in the $\beta$ crystalline form.

In common with other glyceride fats, the medium chain triglycerides of the present invention can exist in three crystalline forms, $\alpha$, $\beta$ and $\beta^1$. The majority of these triglycerides in the $\alpha$ and $\beta^1$ forms are liquid at room temperature, for example even $\beta^1$ tricaprin melts at 18° C. The $\beta$ crystalline form of this component melts at 31.5° C. however and may therefore comprise part of a plastic fat composition.

A plastic fat composition is one which is spreadable at room temperature, i.e., between 15° and 22° C. Spreadability has been evaluated with reference to hardness measurements by Haighton, (Fette, Seifen, Anstrichmittel, 65, 479–482 (1963)). According to this publication, hardness values below 100 g./cm² refer to a very soft unstable product, and above 1,500 g./cm² the product is too hard. The range 100–800 is preferred for good spreadability, but 800–1500 is still acceptable.

The hardness measurements represent yield values determined by cone penetrometer as described in J.A. Oil C.S. 36, 349 (1959), usually with a cone weighing 80 g. with an angle of 40° C.

It is clearly necessary for spreadability to avoid the sharp melting characterizing a pure compound and for this reason the compositions of the present invention contain at least one more $C_8/C_{10}$ triglyceride in addition to tricaprin. Preferably the $C_8/C_{10}$ mixture contains 45–95 percent tricaprin. In particular, the plastic fat compositions of the invention contain at least 80 percent tricaprin and monocaprylodicaprin, and the major part of the crystalline form of the fat is not greater than $20\mu$. This ensures that, over the range specified, the fat is a plastic. The particle size requirement also avoids a sandy taste for the edible plastic compositions of the invention.

A characteristic property of $C_8/C_{10}$ glycerides is that they are absorbed by a different metabolic mechanism from that involved in the case of higher glycerides and they may therefore be prescribed to patients whose normal fat metabolism is disturbed. The invention extends therefore to plastic edible spreads the fat content of which consists substantially entirely of the plastic $C_8/C_{10}$ mixture, including margarine which may be spread in the normal manner. In addition, the invention includes emulsified spreads, for example, margarine, in which part or all the customary range of higher fats is replaced by the plastic mixture of $C_8$ and $C_{10}$ glycerides as hereinbefore defined. In particular, the invention includes margarine fat compositions in which the plastic fat comprising $C_8$ and $C_{10}$ glycerides predominates and is blended with a minor proportion, e.g., 5 percent of a vegetable oil the glycerides of which contain at least 40 percent polyunsaturated fatty acids. Margarine based on such compositions thus combines the dietetic advantage attributed to $C_8/C_{10}$ fats with that of such highly unsaturated constituents, at the same time remaining spreadable and plastic at room temperatures, with 90 percent or more of the $C_8/C_{10}$ fat.

The spreadability of the fat compositions of the invention which consist largely or solely of $C_8$ and $C_{10}$ glycerides is surprising in view of the fact that hitherto fats with good spreadability have been characterized by comparatively flat dilatation curves whereas these compositions of the invention have substantially steeper dilatation curves because of the relatively few distinct chemical entities which they contain in comparison with natural fats such as coconut or cocoa butter fats. It was unexpected, therefore, that the $C_8$ and $C_{10}$ glycerides alone could be obtained in a desirable consistency for spreading, even with higher melting points.

A further advantage of the compositions of the invention the fat content of which consists substantially wholly of $C_8$ and $C_{10}$ glycerides is that being all saturated, these glycerides are substantially more resistant to oxidation than natural fats containing unsaturated acids e.g., oleic, linoleic, and linolenic acids, while yet being obtained in plastic form. Where natural fats are hydrogenated sufficiently to stabilize the fat by removing centers of unsaturation, the product may commonly be too hard to be incorporated in spreadable products in more than limited amounts. The invention therefore includes natural fat compositions of which only part is replaced by the plastic compositions of $C_8$ and $C_{10}$ glycerides. In this further function as additives to otherwise conventional fat compositions the $C_8/C_{10}$ glycerides are preferably present to at least 15 percent. The compositions of which they form part may be intended for non-edible use, e.g., in creams, ointments, suppositories, and other constituents and bases for cosmetic and pharmaceutical purposes.

Other compositions in which the mixtures of glycerides may be present include films for packaging foils to reduce the adhesion between the packaging material and the packaged contents and to minimise water-permeability. They may also be present in solid solvents, e.g., for phosphatides.

A particularly important application of the use as additives of the mixtures of $C_8$ and $C_{10}$ glycerides according to the invention is however in edible fat compositions. $C_8$ and $C_{10}$ glyceride fat compositions of the invention melt over a very narrow range, about 8° to 10° C.; they thus confer a marked "cooling" effect on the tongue, even in contact with it at room temperature, because of the rapid removal of the heat of melting. The compositions are therefore, particularly suitable as additives, in relatively small amounts, to confer this effect on otherwise conventional edible fat products, e.g., margarine, filling for cream wafers, coating masses for baked goods and the like. Preferably at least 15 percent of the additive is used, but 50 percent or more of the $C_8/C_{10}$ solids may be present in spreadable products. It has been observed, for example, that 15 percent added to a margarine imparts as much "cooling" effect as 30 percent of coconut oil, while giving better consistency and spreadability.

The amount of $\beta$ crystalline form present in the mixture of $C_8$ and $C_{10}$ glycerides is preferably at least 50 percent to maintain good plasticity over a wide range. The $\beta$ form is the most stable and has the highest melting point of the three crystalline forms. The $\beta$ form is readily obtained by effecting super-cooling of the molten mixture of $C_8$ and $C_{10}$ glycerides, preferably to temperatures at least 12° C. and more especially at least 15° C. below the melting point of the mixture, and continuing crystallization preferably at higher temperatures. These may be reached by warming the mixture to e.g., 12° to 22° C, according to the composition of the fat.

Where the mixture of $C_8$ and $C_{10}$ glycerides according to the invention is incorporated in foodstuffs, the mixture is preferably subjected to mechanical treatment to comminute a major part of the $\beta$ form present to a particle size not greater than $20\mu$ and preferably below $15\mu$. This further treatment, which may be carried out during crystallisation, ensures that sandiness in taste is avoided.

In the mixtures of $C_8$ and $C_{10}$ glycerides according to the invention excellent results have been obtained with weight values for the $C_8:C_{10}$ fatty acids of (25 to 5):(75 to 95) and more particularly from (15 to 5):(85 to 95) and especially (13 to 10):(87 to 90).

The $C_8:C_{10}$ composition may be made up of glycerides in the fat which contain in the same molecule other fatty acid residues.

Thus in compositions in which at least 90 percent consists of the mixture of $C_8$ and $C_{10}$ glycerides, the remainder may consist to a considerable extent of edible compositions of glycerides of polyunsaturated fatty acids, particularly linoleic acid, which may also contain $C_8$ and $C_{10}$ acids in the same glyceride molecule. Preferably also the mixture contains at least 50 percent tricaprin and at least 80 percent and preferably more than 85 percent is tricaprin and monocaprylodiacaprin. The ratio of tricaprin to monocaprylodicaprin is preferably (45 to 95):(40 to 5). Preferably also, the combined content of tricaprylin and monocaprinodicaprylin is kept to 20 percent at most, and preferably less than 15 percent.

In addition to the glycerides described, which are triglycerides, the compositions of the invention may also contain a proportion of $C_8$ and $C_{10}$ diglycerides. The amount which may be present is not critical, but is preferably not more than 20%, and in particular is preferably 2 to 15 percent, referred to the $C_8$ and $C_{10}$ glycerides. Preferably the overwhelming proportion of diglyceride present is dicaprin.

By contrast preferably edible compositions of the invention contain substantially no monoglycerides, since these have an undesirable taste effect and even in additive compositions the monoglyceride content should not exceed 0.1 percent. of $C_8$ and $C_{10}$ monoglycerides.

The invention may be more clearly understood by reference to the accompanying Examples.

EXAMPLE 1

963 g. of capric acid (99.5 percent) and 145 g. of caprylic acid (99.5 percent) were esterified with 188 g. of 99 percent glycerol (90 percent of theory) with the addition of 1.22 g. of caustic soda as catalyst. During the esterification, a pressure of 20–25 mm Hg was maintained, and the temperature of the mixture was initially 150° C. and was raised gradually to 195° C. After 24 hours, the esterification was ended at an acid number of 20.8, and the product was deacidified with a 10 percent excess of 2 N caustic soda solution at 90° C. washed with water, and post-deacidified with 0.2 N caustic soda solution. The fat was washed to neutrality with hot water, dried for 30 min. at 95° C. in vacuum with stirring, and subsequently bleached with 5 percent of bleaching earth for 30 min. under the same conditions. The fat was filtered and heated with 30 percent of water for 6 hours at 180° C. and 5 mm Hg in a laboratory steamer.

In the final product (about 970 g.), monoglycerides could no longer be detected by thin-layer chromatography, and the content of diglycerides (by GLC) was 6 percent. The content of tricaprin was 55.6 percent and that of monocaprylodicaprin 31.5 percent. The remaining 6.9 percent consisted of 6.5 percent of dicaprylomonocaprin and 0.4 percent of tricaprylin. The acid number was 0.04. The melting point on heating was 23.5° C.

To make a margarine, after the addition of 0.2 percent of defatted alcohol-soluble soya phosphatide fraction and 0.2 percent of a mixture of mono- and diglycerides from hardened palm oil, 240 g. (80 percent) of this fat was melted at 37° C. and emulsified in the Hobart mixer with 20 percent of an aqueous phase, which consisted of 30 g. of skim milk soured by lactic acid fermentation and 30 g. of water. The emulsion was cooled to below +10° C. and stirred, whereupon the fat crystallized. After crystallization was complete, the margarine was homogenized in a homogenizing machine (Gann-Emulgor, setting 4) at about 18° C. three times, whereupon more than 50 percent of the β-crystals previously formed were brought to a crystal size of less than 10μ, filled into containers, and stored at +15° C. for 1 day. The sample was then deaerated and stored at +15° C. The margarine possessed good spreadability between +10° and +20° C. and gave an extraordinarily strong cooling effect on melting on the tongue. ($D_{15}$–$D_5$ of the fat: 1050, dilatation in $mm^3/25$ g. according to Boekenoogen "Analysis and Characterisation of Oils, Fats and Fat Products" (1964), Vol. 1, p. 144).

EXAMPLE 2

A margarine the fat phase of which consisted of 95 percent of glycerides of $C_8$ and $C_{10}$ fatty acids and 5 percent of sunflower seed oil was made in essentially the same manner as in Example 1. The fat composition was as follows:

| | |
|---|---|
| Tricaprin | 55.1% |
| Monocaprylodicaprin | 28.3% |
| Dicaprylomonocaprin | 5.8% |
| Tricaprylin | 0.4% |
| $C_8$ and $C_{10}$ diglycerides | 5.4% |
| | Subtotal: 95.0% |
| Sunflower seed oil | 5.0% |
| | Total: 100.0% |

The β phase content of the $C_8/C_{10}$ mixture was more than 50 percent and the particle size of the crystals was below 10μ.

The margarine had similar desirable properties to the margarine prepared according to Example 1.

A series of trials was carried out on various fat compositions prepared and incorporated in an emulsion similar to those described in Example 1. The particulars of the compositions are set out in Table 1, in which the hardness values are C values at 15° C. in $g/cm^2$ according to Haighton's publication. In all the trials the monoglyceride content of the samples was less than 0.1 percent.

TABLE I

| | Composition, wt. percent | | | M.P., °C. | Hardness at 15° C, | | Particle size μ after |
|---|---|---|---|---|---|---|---|
| | Tricaprin | Tricaprin plus monocaprylo- dicaprin | Diglyceride | | Before | After | |
| 1 | 8.5 | 35.8 | --- | <0 | --- | --- | ≧20 |
| 2 | 45.1 | 61.1 | 3.0 | 19 | 470 | <40 | ≧50 |
| 3 | 64.0 | 75 | 2.0 | 24.8 | 3,500 | 180 | ≧20 |
| 4 | 59.4 | 82.2 | 3.0 | 24.5 | >3,000 | 950 | ≧50 |
| 5 | 95.4 | 96.8 | 0.1 | 28.8 | >3,000 | *2,800 | ≧50 |
| 6 | 100 | 100 | 0 | 30 | >3,000 | --- | ≧50 |
| 7 | 55 | 76 | 19.5 | 20 | --- | --- | ≦20 |

*At 22° C,

Comparing the emulsified products of these trials, the first was fully liquid. In trial 2 the product contained less than 80 percent tricaprin, in the fat phase but samples based on the fat before comminution could be spread, although some sandiness in taste was observed. The composition could be used, for example in ointments and creams for non-edible purposes.

As the total content of tricaprin and monocaprylodicaprin is increased, the product hardens, as shown by trial 3, so that after comminution it was satisfactory in a spreadable product. It was less satisfactory as an additive in about 15 percent to conventional margarine fats, although it was cool-tasting, because in comminuted form it was very soft at higher room temperatures. The comminuted product of trial 4 fulfils all the preferred requirements according to the invention for a fat suitable for use as the sole fat in a margarine fat or as an additive to conventional margarines. Margarines based solely on this product could be easily spread and showed no sandiness. A small amount of the comminuted product added to conventional margarine fat conferred remarkable coolness without sandiness.

The product of trial 5 contained too much tricaprin to be entirely satisfactory as the sole fat in margarine, and was not sufficiently soft at lower room temperatures. The hardness value was in fact measured at 22° C. because at 15° C. the fat was too hard for an accurate measurement to be made. Where as in trial 6 the product was solely tricaprin, the product was a crystalline powder which could not be spread even at higher room temperatures, above which eventually it melted sharply. Trial 7 was carried out to illustrate the effect of high diglyceride content upon the product. The composition was prepared by interesterification of a mixture of $C_8$ and $C_{10}$ triglycerides containing 65 percent tricaprin and 26 percent monocaprylodicaprin with 2 percent glycerol in the presence of sodium methoxide as catalyst. The interesterified mixture was washed with water to remove catalyst and dried.

Although the melting points of diglycerides are higher than those of corresponding triglycerides, a high diglyceride content is seen in trial 7 to depress the melting point of the fat to the point where it is plastic only in the lower ranges of room temperatures.

What is claimed is:

1. A mixture of glycerides of saturated $C_8$ and $C_{10}$ fatty acids consisting essentially of:
   i. tricaprin, and
   ii. monocaprylodicaprin, said tricaprin being present in the amount of 45 percent to 95 percent by weight of said mixture, the total of tricaprin and monocaprylodicaprin being at least 80 percent by weight of said mixture, the ratio of tricaprin to monocaprylodicaprin being 45 to 95 parts by weight of tricaprin to 40 to five parts by weight of monocaprylodicaprin, at least 20 percent of said mixture of glycerides being in the beta crystal form, said mixture of glycerides containing substantially no monoglycerides, and not more than 20 percent of $C_8$ and $C_{10}$ diglycerides.

2. Mixture of glycerides according to claim 1 wherein at least 50 percent of said mixture is in beta crystal form.

3. Mixture of glycerides according to claim 1 wherein the ratio of fatty acids combined as residues is 13–10 parts of $C_8$ fatty acids to 87–90 parts of $C_{10}$ fatty acids.

4. Mixture of glycerides according to claim 1 wherein the particle size of the major part of the beta crystals is not greater than 20microns.

5. An edible plastic fat composition suitable for use as the sole fat in the formulation of a margarine fat consisting essentially of the mixture of glycerides of claim 25 and a vegetable oil the glycerides of which contain at least 40% polyunsaturated fatty acids, the proportion of said mixture of glycerides of claim 25 being at least 90 percent of said composition, the remainder consisting of said vegetable oil.

6. An edible plastic fat composition in accordance with claim 5 wherein said vegetable oil is sunflower oil.

7. Process for the preparation of a plastic fat composition as claimed in claim 4 which comprises supercooling said mixture of $C_8$ and $C_{10}$ glycerides to a temperature of at least 12° C below its melting point, crystallizing said mixture until at least 20 percent thereof is present in the beta crystalline form and comminuting said crystallized mixture until the size of the major part of said beta crystals is not greater than 20 microns.

8. Process according to claim 7 wherein said mixture is crystallized at a temperature of 12° to 22°C.

9. A margarine consisting essentially of about 80 percent of a fat phase and about 20 percent of an aqueous phase, wherein said fat phase comprises the mixture of glycerides of claim 4.

10. A margarine consisting essentially of about 80% of a fat phase and about 20% of an aqueous phase, wherein said fat phase comprises the composition of claim 5.

11. A margarine in accordance with claim 9 wherein said fat phase comprises

| | |
|---|---|
| Tricaprin | 55.1% |
| Dicaprylomonocaprin | 5.8% |
| Monocaprylodicaprin | 28.3% |
| Tricaprylin | 0.4% |
| $C_8$ and $C_{10}$ diglycerides | 5.4% |
| Sunflower seed oil | 5.0% |
| | Total: 100.0% |

* * * * *